(12) United States Patent
Yamashita et al.

(10) Patent No.: US 11,498,609 B2
(45) Date of Patent: Nov. 15, 2022

(54) CONTROL APPARATUS AND CONTROL METHOD FOR VEHICLE PROVIDED WITH A STEER-BY-WIRE SYSTEM

(71) Applicant: Toyota Jidosha Kabushiki Kaisha, Toyota (JP)

(72) Inventors: Masaharu Yamashita, Toyota (JP); Shintaro Takayama, Toyota (JP); Yosuke Yamashita, Nagoya (JP); Hiroaki Hanzawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 16/819,672

(22) Filed: Mar. 16, 2020

(65) Prior Publication Data

US 2020/0307675 A1 Oct. 1, 2020

(30) Foreign Application Priority Data

Mar. 27, 2019 (JP) .............................. JP2019-061647

(51) Int. Cl.
*B62D 5/00* (2006.01)
*B60W 40/08* (2012.01)
*B60W 50/12* (2012.01)
*B62D 5/04* (2006.01)
*B60W 10/20* (2006.01)

(52) U.S. Cl.
CPC ............ *B62D 5/006* (2013.01); *B60W 40/08* (2013.01); *B60W 50/12* (2013.01); *B62D 5/046* (2013.01); *B62D 5/0481* (2013.01); *B60W 10/20* (2013.01)

(58) Field of Classification Search
CPC ............................. B60W 40/08; B62D 5/0006
See application file for complete search history.

(56) References Cited

U.S. PATENT DOCUMENTS

| 5,896,942 | A | * | 4/1999 | Bohner | B62D 5/005 |
| | | | | | 180/444 |
| 2013/0304317 | A1 | * | 11/2013 | Takiguchi | B60W 30/18145 |
| | | | | | 701/36 |
| 2019/0092377 | A1 | * | 3/2019 | Shin | H02P 6/16 |
| 2019/0375447 | A1 | * | 12/2019 | Zuzelski | B62D 1/00 |
| 2020/0062292 | A1 | * | 2/2020 | Shin | B62D 5/005 |

FOREIGN PATENT DOCUMENTS

JP 2009-090686 A 4/2009

* cited by examiner

*Primary Examiner* — Jess Whittington
(74) *Attorney, Agent, or Firm* — Dinsmore & Shohl LLP

(57) ABSTRACT

A steer-by-wire vehicle includes a steering actuator configured to turn a wheel and a reaction actuator configure to apply a torque to a steering wheel. An electronic control unit of a control apparatus for the vehicle is configured to execute normal steering control for turning the wheel and applying a reaction torque to the steering wheel according to a rotation of the steering wheel, and, when an activation condition including that the normal steering control is not needed is satisfied, execute rotation suppression control for suppressing the rotation of the steeling wheel without prohibiting the rotation of the steering wheel. Specifically, the electronic control unit is configured to, based on a steering speed or a steering torque, determine a rotation suppression torque for suppressing the rotation of the steering wheel, and control the reaction actuator such that the rotation suppression torque is applied to the steering wheel.

12 Claims, 6 Drawing Sheets

CONTROL APPARATUS AND CONTROL METHOD FOR VEHICLE PROVIDED WITH A STEER-BY-WIRE SYSTEM

CROSS-REFERENCE TO RELATED APPLICATIONS

This application claims priority to No. 2019-061647 filed on Mar. 27, 2019 incorporated herein by reference in its entirety.

BACKGROUND

1. Technical Field

The disclosure relates to a control apparatus and control method for a vehicle provided with a steer-by-wire system.

2. Description of Related Art

Japanese Unexamined Patent Application Publication No. 2009-090686 (JP 2009-090686 A) describes a steer-by-wire vehicle. A steering system for a vehicle detects a steering angle of a steering wheel and turns wheels based on the steering angle. A driver of the vehicle may move from the outside of a vehicle cabin to the inside of the vehicle cabin or move from the inside of the vehicle cabin to the outside of the vehicle cabin. While such a movement of the driver is being detected, the steering system locks the steering wheel. More specifically, the steering system completely locks the steering wheel by actuating a reaction actuator such that the steering wheel does not rotate even when external force is applied.

SUMMARY

In a steer-by-wire vehicle, a steering wheel and wheels are mechanically isolated from each other. Such a steer-by-wire vehicle includes a reaction actuator for simulating a steering reaction force that a driver experiences at the time of steering. When the vehicle is traveling, the reaction actuator applies a reaction torque corresponding to a steering reaction force to the steering wheel according to steering by the driver.

A driver may use a steering wheel for purposes other than steering. For example, when a driver gets on or gets off a vehicle, the driver may move using a steering wheel as a support. In another example, a driver may get his or her baggage caught by a steering wheel. At this time, if the steering wheel rotates without limit, the driver cannot make full use of the steering wheel. In other words, the usability of the steering wheel is poor.

According to JP 2009-090686 A, in order for the steering wheel not to rotate even when external force is applied, the steering wheel is completely locked by actuating the reaction actuator. At this time, the reaction actuator outputs a large torque such that the steering wheel to which external force is applied does not rotate. When application of external force to the steering wheel continues for a long time, the reaction actuator needs to continuously output a large torque. As a result, the reaction actuator may overheat. Overheating of the reaction actuator causes degradation of the reaction actuator. When overheat protection control activates, the output torque of the reaction actuator is limited. Degradation or output limitation of the reaction actuator impairs normal reaction torque control thereafter.

The disclosure provides a technique for, in a steer-by-wire vehicle, making it possible to improve the usability of a steering wheel while avoiding overheating of a reaction actuator.

A first aspect of the disclosure relates to a control apparatus for a vehicle provided with a steer-by-wire system. The vehicle includes a steering actuator configured to turn a wheel of the vehicle, a reaction actuator configured to apply a torque to a steering wheel of the vehicle, and a steering sensor configured to detect a rotation of the steering wheel. The control apparatus includes an electronic control unit configured as follows. The electronic control unit is configured to execute normal steering control for, according to a rotation of the steering wheel, turning the wheel by controlling the steering actuator and applying a reaction torque to the steering wheel by controlling the reaction actuator. When an activation condition including that the normal steering control is not needed is satisfied, the electronic control unit is configured to execute rotation suppression control for suppressing the rotation of the steering wheel without prohibiting the rotation of the steering wheel. In the rotation suppression control, the electronic control unit is configured to acquire a steering speed or steering torque of the steering wheel as a steering parameter based on a result detected by the steering sensor, determine a rotation suppression torque for suppressing the rotation of the steering wheel based on the steering parameter, and control the reaction actuator such that the rotation suppression torque is applied to the steering wheel.

According to the above first aspect, when the activation condition including that the normal steering control is not needed is satisfied, the electronic control unit is configured to execute rotation suppression control for suppressing the rotation of the steering wheel without prohibiting the rotation of the steering wheel. In the rotation suppression control, the electronic control unit is configured to apply the steering wheel with a rotation suppression torque for suppressing the rotation of the steering wheel by controlling the reaction actuator. Because the rotation of the steering wheel is suppressed, a driver more easily uses the steering wheel for purposes other than steering. In other words, the usability of the steering wheel improves.

The electronic control unit is configured to execute rotation suppression control without prohibiting the rotation of the steering wheel. Therefore, a large rotation suppression torque is not unnecessarily generated. As a result, overheating a the reaction actuator that generates a rotation suppression torque is avoided. Avoiding overheating and degradation of the reaction actuator is good from the viewpoint of normal steering control.

The steering parameter such as a steering speed and a steering torque reflects the rotation of the steering wheel, that is, driver's intention. By referencing such a steering parameter, it is possible to appropriately detect the rotation of the steering wheel, that is, driver's intention, and generate a rotation suppression torque at appropriate timing.

In the control apparatus of the first aspect, a first steering parameter may be less than a second steering parameter. The rotation suppression torque in a case where the steering parameter is the first steering parameter may be less than the rotation suppression torque in a case where the steering parameter is the second steering parameter.

With the above configuration, the magnitude of rotation suppression torque varies with the steering parameter. Thus, it is possible to generate a rotation suppression torque having an appropriate magnitude. For example, when a driver input torque is relatively large, the steering parameter is also relatively large, so the rotation suppression torque is also relatively large. Thus, an excessive rotation of the steering wheel is prevented. On the other hand, when a driver input torque is relatively small, the steering parameter is also relatively small, so the rotation suppression torque is also relatively small. This contributes to suppressing overheating of the reaction actuator.

In the control apparatus of the first aspect, when the steering parameter falls within a predetermined range including zero, the rotation suppression torque may be zero. In the control apparatus of the above aspect, when the steering parameter falls outside the predetermined range, the rotation suppression torque may monotonously increase with the steering parameter.

With the above configuration, erroneous generation of a rotation suppression torque due to noise is reduced.

In the control apparatus of the first aspect, in an entire range of the steering parameter, the rotation suppression torque may increase in a stepwise manner with the steering parameter. Furthermore, in an entire range of the steering parameter, the rotation suppression torque may monotonously increase with the steering parameter.

With the above configuration, erroneous generation of a rotation suppression torque due to noise is reduced.

In the control apparatus of the first aspect, the vehicle may further include a status sensor configured to detect at least one of a status of the vehicle and a status of a driver of the vehicle. The electronic control unit may be configured to, based on a result detected by the status sensor, detect a boarding action that the driver gets on the vehicle or an alighting action that the driver gets off the vehicle. The electronic control unit may be configured to, at least while the boarding action or the alighting action is being performed, determine that the normal steering control is not needed and the activation condition is satisfied.

In the control apparatus of the first aspect, the status sensor may include at least any one of a door status sensor, a seat status sensor, an ignition sensor, and a driver monitor. The door status sensor may be configured to detect an open or closed state and locked state of a door of the vehicle. The seat status sensor may be configured to detect whether the driver is seated on a driver seat. The ignition sensor may be configured to detect whether an ignition is on or off. The driver monitor may be configured to detect a status of the driver.

In the control apparatus of the first aspect, the electronic control unit may be configured to start the rotation suppression control in response to turning off of an ignition or a start of the alighting action and stop the rotation suppression control in response to completion of the alighting action.

In the control apparatus of the first aspect, the electronic control unit may be configured to start the rotation suppression control in response to a start of the boarding action and stop the rotation suppression control in response to completion of the boarding action or turning on of an ignition.

With the above configuration, the usability of the steering wheel at the time when the driver performs a boarding action or alighting action improves.

In the control apparatus of the first aspect, the electronic control unit may be configured to execute autonomous driving control for controlling autonomous driving of the vehicle, and may be configured to, while the autonomous driving control is being executed, determine that the normal steering control is not needed and the activation condition is satisfied.

With the above configuration, because the rotation suppression control is activated during execution of the autonomous driving control, the steering wheel is difficult to erroneously rotate.

A second aspect of the disclosure relates to a control method for a vehicle provided with a steer-by-wire system. The vehicle includes a wheel steering actuator configured to turn a wheel of the vehicle, a reaction actuator configured to apply a torque to a steering wheel of the vehicle, and a steering sensor configured to detect a rotation of the steering wheel. The control method includes executing normal steering control to for, according to the rotation of the steering wheel, turning the wheel by controlling the steering actuator and applying a reaction torque to the steering wheel by controlling the reaction actuator; when an activation condition including that the normal steering control is not needed is satisfied, executing rotation suppression control for suppressing the rotation of the steering wheel without prohibiting the rotation of the steering wheel; and, in the rotation suppression control, acquiring a steering speed or steering torque of the steering wheel as a steering parameter based on a result detected by the steering sensor, determining a rotation suppression torque for suppressing the rotation of the steering wheel based on the steering parameter, and controlling the reaction actuator such that the rotation suppression torque is applied to the steering wheel.

According to the second aspect, as well as the effects from the control apparatus of the above-described first aspect, because the rotation of the steering wheel is suppressed, the driver more easily uses the steering wheel for purposes other than steering. The usability of the steering wheel improves, and overheating of the reaction actuator that generates a rotation suppression torque is avoided. Furthermore, it is possible to appropriately detect the rotation of the steering wheel, that is, driver's intention, and generate a rotation suppression torque at appropriate timing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
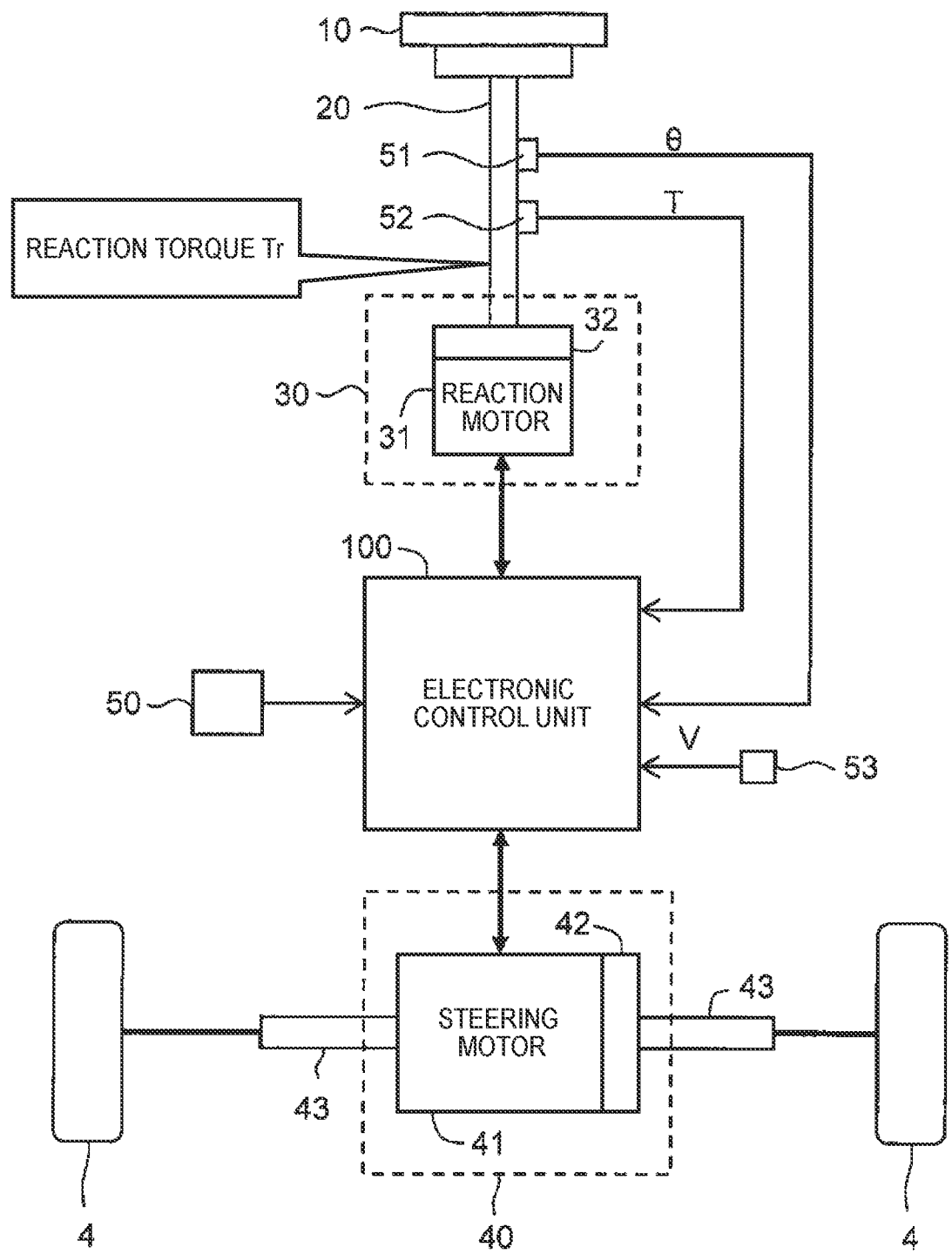
FIG. 1 is a block diagram that schematically shows an example the configuration of a steer-by-wire vehicle according to an embodiment of the disclosure.

An embodiment of the disclosure will be described with reference to the accompanying drawings. First, a steer-by-wire vehicle will be described. FIG. 1 is a block diagram that schematically shows an example of the configuration of the steer-by-wire vehicle 1, which is an example of a vehicle provided with a steer-by-wire system, according to the present embodiment. The vehicle 1 includes wheels 4, a steering wheel 10, a steering shaft 20, a reaction actuator 30, a steering actuator 40, a status sensor 50, a steering angle sensor 51, a steering torque sensor 52, a vehicle speed sensor 53, and a control apparatus including an electronic control unit 100.

The steering wheel 10 is an operating member that a driver uses for steering. The steering shaft 20 is coupled to the steering wheel 10 and rotates with the steering wheel 10. The wheels 4 and the steering wheel 10 (steering shaft 20) are mechanically isolated from each other or can be mechanically coupled to or isolated from each other. In the following description, a mode in which the wheels 4 and the steering wheel 10 are mechanically isolated from each other is assumed.

The reaction actuator 30 applies a torque to the steering wheel 10. For example, the reaction actuator 30 includes a reaction motor 31. A rotor of the reaction motor 31 is coupled to the steering shaft 20 via a speed reducer 32. A torque can be applied to the steering shaft 20 and, by extension, the steering wheel 10 by actuating the reaction motor 31. The operation of the reaction actuator 30 (reaction motor 31) is controlled by the electronic control unit 100.

The steering actuator 40 turns the wheels 4. For example, the steering actuator 40 includes a steering motor 41. A rotor of the steering motor 41 is coupled to a wheel steering shaft 43 via a speed reducer 42. The wheel steering shaft 43 is coupled to the wheels 4. As the steering motor 41 rotates, the rotational motion is converted to the linear motion of the wheel steering shaft 43, with the result that the wheels 4 are turned. In other words, the wheels 4 can be turned by actuating the steering motor 41. The operation of the steering actuator 40 (steering motor 41) is controlled by the electronic control unit 100.

Figure 7:
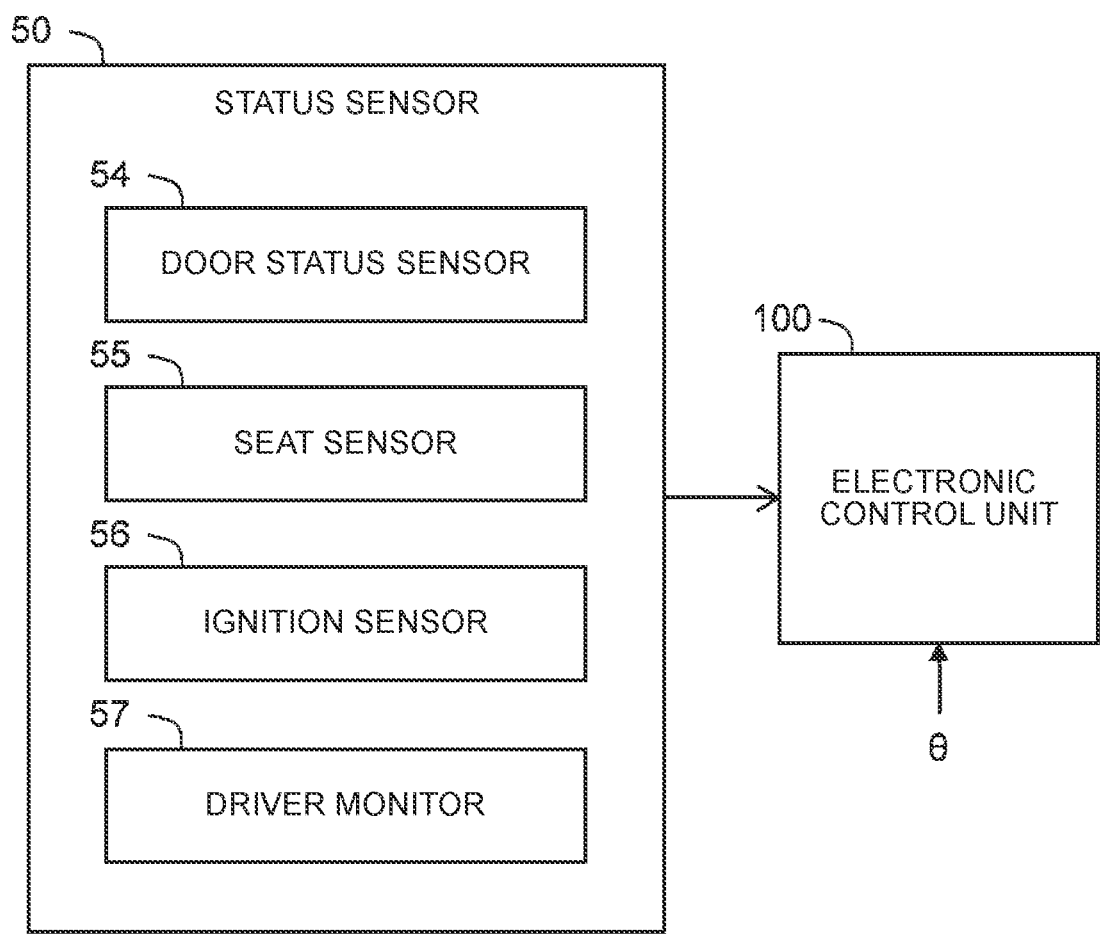
FIG. 7 is a block diagram that shows an example of the configuration for detecting a boarding action and an alighting action that a driver performs according to the embodiment of the disclosure.

A group of sensors includes the steering angle sensor 51, the steering torque sensor 52, and the vehicle speed sensor 53 as shown in FIG. 1, the status sensor 50 that detects at least one of the status of the vehicle 1 and the status of the driver as shown in FIG. 7, and the like.

The steering angle sensor 51 detects a steering angle θ of the steering wheel 10 (steering wheel angle). The steering angle sensor 51 may be a rotational angle sensor that detects a rotational angle of the reaction motor 31. In this case, a steering angle θ is calculated from the rotational angle of the reaction motor 31. The steering angle sensor 51 sends information on the steering angle θ to the electronic control unit 100.

The steering torque sensor 52 detects a steering torque T applied to the steering shaft 20. The steering torque sensor 52 sends information on the steering torque T to the electronic control unit 100.

The steering angle sensor 51 and the steering torque sensor 52 are regarded as making up a steering sensor that detects a rotation of the steering wheel 10.

The vehicle speed sensor 53 detects a vehicle speed V that is the speed of the vehicle. The vehicle speed sensor 53 sends information on the vehicle speed V to the electronic control unit 100. A wheel speed sensor may be used instead of the vehicle speed sensor 53, and a vehicle speed V may be calculated from a rotation speed of each wheel 4.

The electronic control unit 100 of the control apparatus of the present embodiment controls the vehicle 1 according to the present embodiment. The electronic control unit 100 includes a microcomputer including a processor and a memory. Various processes of the electronic control unit 100 are implemented by the processor running a control program stored in the memory.

For example, the electronic control unit 100 turns the wheels 4 and applies a reaction torque Tr to the steering wheel 10 according to the rotation of the steering wheel 10 (steering) by the driver.

Specifically, the electronic control unit 100 turns the wheels 4 synchronously with a steering angle θ by controlling the steering actuator 40. For example, the electronic control unit 100 calculates a target wheel steering angle based on a steering angle θ and a vehicle speed V. A wheel steering angle of the wheels 4 is, for example, calculated from the rotational angle of the steering motor 41. The electronic control unit 100 controls the operation of the steering motor 41 such that the wheel steering angle of the wheels 4 follows the target wheel steering angle. More specifically, the electronic control unit 100 generates a control signal for driving the steering motor 41 based on a deviation between the wheel steering angle of the wheels 4 and the target wheel steering angle. The steering motor 41 is driven in accordance with the control signal, and the wheels 4 are turned by the rotation of the steering motor 41.

The electronic control unit 100 applies a reaction torque Tr to the steering wheel 10 by controlling the reaction actuator 30. A reaction torque Tr is a torque that simulates a steering reaction force that the driver experiences at the time of steering. For example, the electronic control unit 100 calculates a target reaction torque (spring component) based on a steering angle θ and a vehicle speed V. The target reaction torque corresponds to a self-aligning torque that acts on the wheels 4. A target reaction torque may further contain a damping component commensurate with a steering speed (dθ/dt). The electronic control unit 100 controls the operation of the reaction motor 31 such that the reaction motor 31 generates the target reaction torque. More specifically, the electronic control unit 100 generates a control signal for driving the reaction motor 31 based on the target reaction torque. The reaction motor 31 is driven in accordance with the control signal, with the result that a reaction torque Tr is generated.

The electronic control unit 100 may separately include a first electronic control unit for controlling the steering actuator 40 and a second electronic control unit for controlling the reaction actuator 30. In this case, the first electronic control unit and the second electronic control unit are connected so as to be communicable with each other, and exchange required information.

In this way, control for turning the wheels 4 and applying a reaction torque Tr to the steering wheel 10 according to a rotation of the steering wheel 10 (steering) is referred to as normal steering control hereinafter. The electronic control unit 100 according to the present embodiment is configured to also execute rotation suppression control, which will be described below, in addition to the normal steering control.

Next, the outline of the rotation suppression control will be described. In a situation in which the normal steering control is not executed, the driver can use the steering wheel 10 for purposes other than steering. For example, when the driver gets on the vehicle 1 or when the driver gets off the vehicle 1, the driver may move using the steering wheel 10 as a support. In another example, the driver may get his or her baggage caught by the steering wheel 10. At this time, if the steering wheel 10 rotates without limit, the driver cannot make full use of the steering wheel 10. In other words, the usability of the steering wheel 10 is poor.

For this reason, when a predetermined condition is satisfied, the electronic control unit 100 according to the present embodiment executes the rotation suppression control for suppressing the rotation of the steering wheel 10. The reaction actuator 30 is used for the rotation suppression control.

Figure 2:
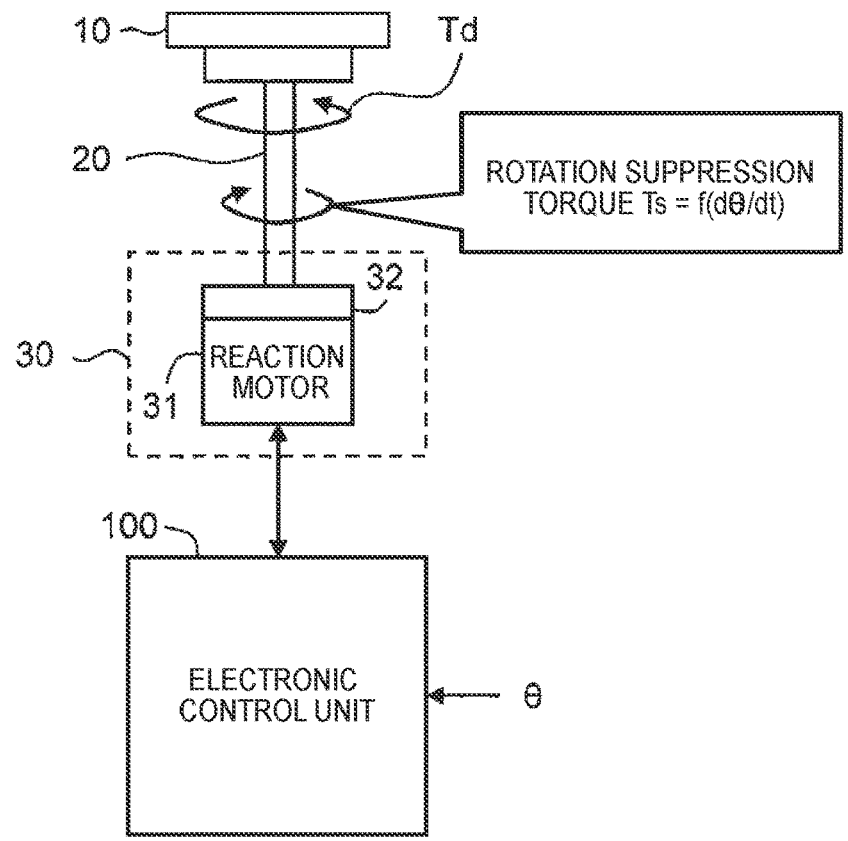
FIG. 2 is a conceptual diagram for illustrating rotation suppression control according to the embodiment of the disclosure.

FIG. 2 is a conceptual diagram for illustrating the rotation suppression control according to the present embodiment. When the driver uses the steering wheel 10 for purposes other than steering, a driver input torque Td acts on the steering wheel 10. The electronic control unit 100 generates a rotation suppression torque Ts for suppressing the rotation of the steering wheel 10, caused by the driver input torque Td, by controlling the reaction actuator 30. The steering wheel 10 rotates according to the difference between the driver input torque Td and the rotation suppression torque Ts.

A rotation suppression torque Ts differs from a reaction torque Tr in the normal steering control. For example, a reaction torque Tr (spring component) acts in a direction to return the steering wheel 10 to a steering center point. Therefore, a reaction torque Tr acts so as to suppress the rotation of the steering wheel 10 at the time when the steering wheel 10 is further turned, but a reaction torque Tr acts in a direction to facilitate the rotation of the steering wheel 10 when the steering wheel 10 is returned. On the other hand, a rotation suppression torque Ts acts in a direction to suppress the rotation of the steering wheel 10 regardless of whether the steering wheel 10 is further turned or returned.

The steering wheel 10 can be completely locked by monitoring a steering angle θ and executing feedback control over the rotation suppression torque Ts such that the steering angle θ remains unchanged. However, in the present embodiment, control for completely locking the steering wheel 10 is not executed. The electronic control unit 100 executes the rotation suppression control without prohibiting the rotation of the steering wheel 10 (variations of the steering angle θ). The steering wheel 10 can rotate according to the difference between a driver input torque Td and a rotation suppression torque Ts. When the rotation suppression torque Ts is large, there can be a case where the steering wheel 10 does not rotate as a result; however, the electronic control unit 100 at least does not actively prohibit the rotation of the steering wheel 10.

Next, an example of a rotation suppression torque will be described. For example, a rotation suppression torque Ts is expressed as a function of a steering speed A (=dθ/dt) of the steering wheel 10. As a general tendency, when the steering speed A is low, the rotation suppression torque Ts is small; whereas, when the steering speed A is high, the rotation suppression torque Ts is large. Here, a high or low steering speed A means that the absolute value of the steering speed A is large or small. A large or small rotation suppression torque Ts means that the absolute value of the rotation suppression torque Ts is large or small. The direction of the rotation suppression torque Ts is a direction to suppress the rotation of the steering wheel 10.

Figure 3:
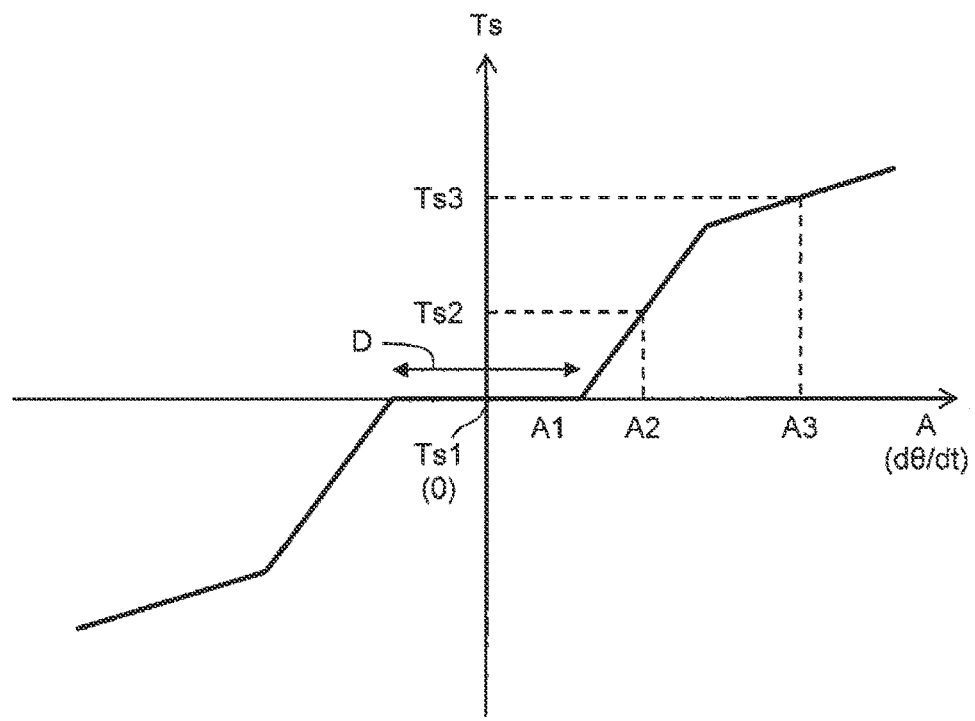
FIG. 3 is a conceptual diagram that shows a first example of the relationship between a rotation suppression torque and a steering speed according to the embodiment of the disclosure.

FIG. 3 is a conceptual diagram that shows a first example of the relationship between a rotation suppression torque Ts and a steering speed A. The abscissa axis represents steering speed A, and the ordinate axis represents rotation suppression torque Ts. The sign of the rotation suppression torque Ts switches according to the sign of the steering speed A. A steering speed A2 is higher than a steering speed A1. A steering speed A3 is higher than the steering speed A2. A rotation suppression torque Ts1 in the case of the steering speed A1 is less than a rotation suppression torque Ts2 in the case of the steering speed A2. The rotation suppression torque Ts2 in the case of the steering speed A2 is less than a rotation suppression torque Ts3 in the case of the steering speed A3. In the first example shown in FIG. 3, a predetermined speed range including a steering speed A of zero is a dead band D, and the rotation suppression torque Ts is zero in the dead band D. In a range other than the dead band D, the rotation suppression torque Ts monotonously increases with an increase in steering speed A.

Figure 4:
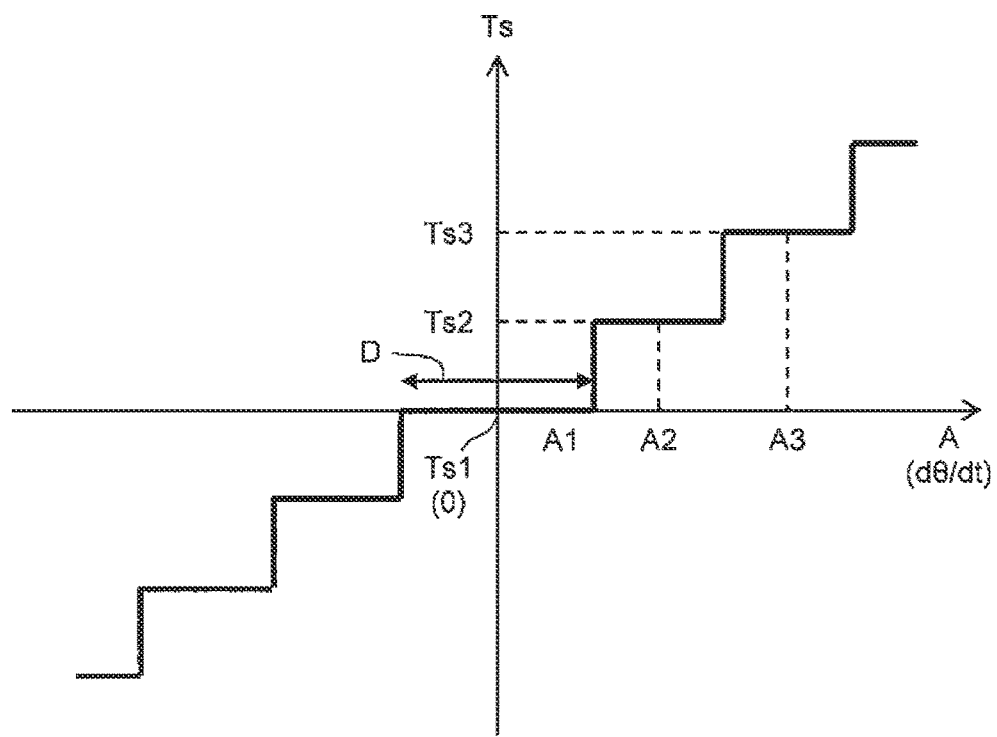
FIG. 4 is a conceptual diagram that shows a second example of the relationship between a rotation suppression torque and a steering speed according to the embodiment of the disclosure.

FIG. 4 is a conceptual diagram that shows a second example of the relationship between a rotation suppression torque Ts and a steering speed A. The relationship among the rotation suppression torque Ts1, the rotation suppression torque Ts2, and the rotation suppression torque Ts3 is the same as that in the case of the first example shown in FIG. 3. In the second example shown in FIG. 4, the rotation suppression torque Ts increases in a stepwise manner with an increase in steering speed A.

Figure 5:
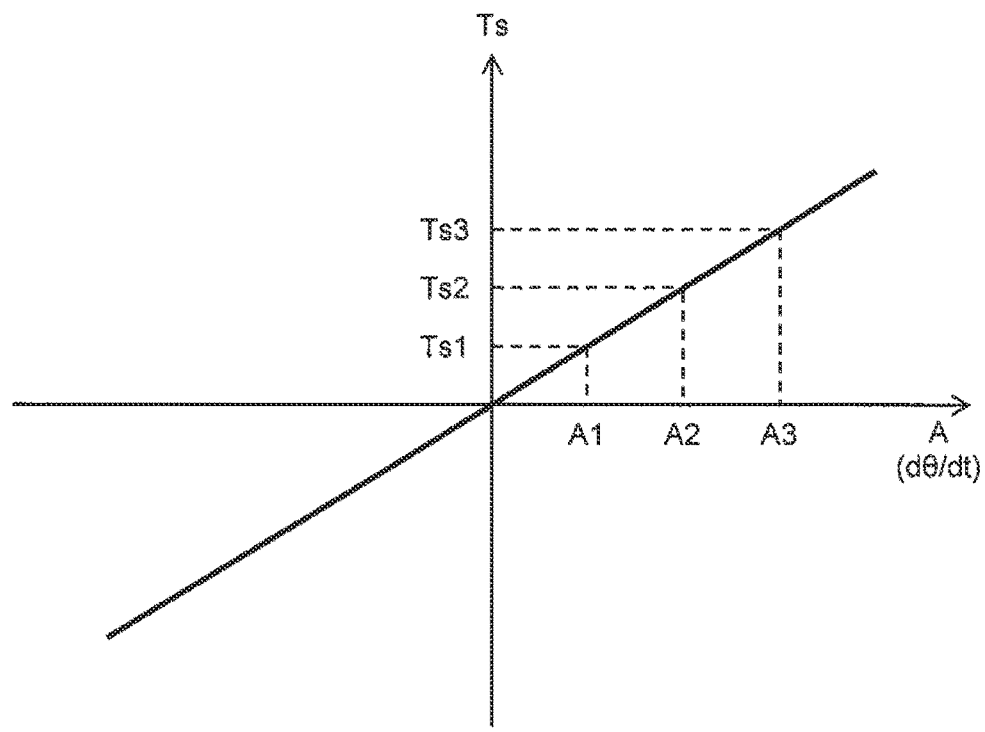
FIG. 5 is a conceptual diagram that shows a third example of the relationship between a rotation suppression torque and a steering speed according to the embodiment of the disclosure.

FIG. 5 is a conceptual diagram that shows a third example of the relationship between a rotation suppression torque Ts and a steering speed A. The relationship among the rotation suppression torque Ts1, the rotation suppression torque Ts2, and the rotation suppression torque Ts3 is the same as that in the case of the first example shown in FIG. 3. In the third example shown in FIG. 5, no dead band D is provided. The rotation suppression torque Ts monotonously increases with an increase in steering speed A.

The electronic control unit 100 calculates a steering speed A based on a steering angle θ that is detected by the steering angle sensor 51. The electronic control unit 100 determines a rotation suppression torque Ts based on the steering speed A. For example, a map that represents the relationship (function) between a rotation suppression torque Ts and a steering speed A as illustrated in FIG. 3 to FIG. 5 is created in advance and stored in the memory of the electronic control unit 100. The electronic control unit 100 determines a rotation suppression torque Ts commensurate with the steering speed A based on the map stored in the memory. The electronic control unit 100 generates the rotation suppression torque Ts by controlling the reaction actuator 30.

Instead of a steering speed A, a steering torque T may be used. In this case, the electronic control unit 100 acquires information of a steering torque T from the steering torque sensor 52. The electronic control unit 100, as in the case of the steering speed A, determines a rotation suppression torque Ts based on the steering torque T.

Making it general, a steering parameter represents a steering speed A or a steering torque T. The electronic control unit 100 acquires a steering parameter based on a result detected by a steering sensor (the steering angle sensor 51 or the steering torque sensor 52). The electronic control unit 100 determines a rotation suppression torque Ts based on the steering parameter. The steering speed A in the above description is read as the steering parameter.

Figure 6:
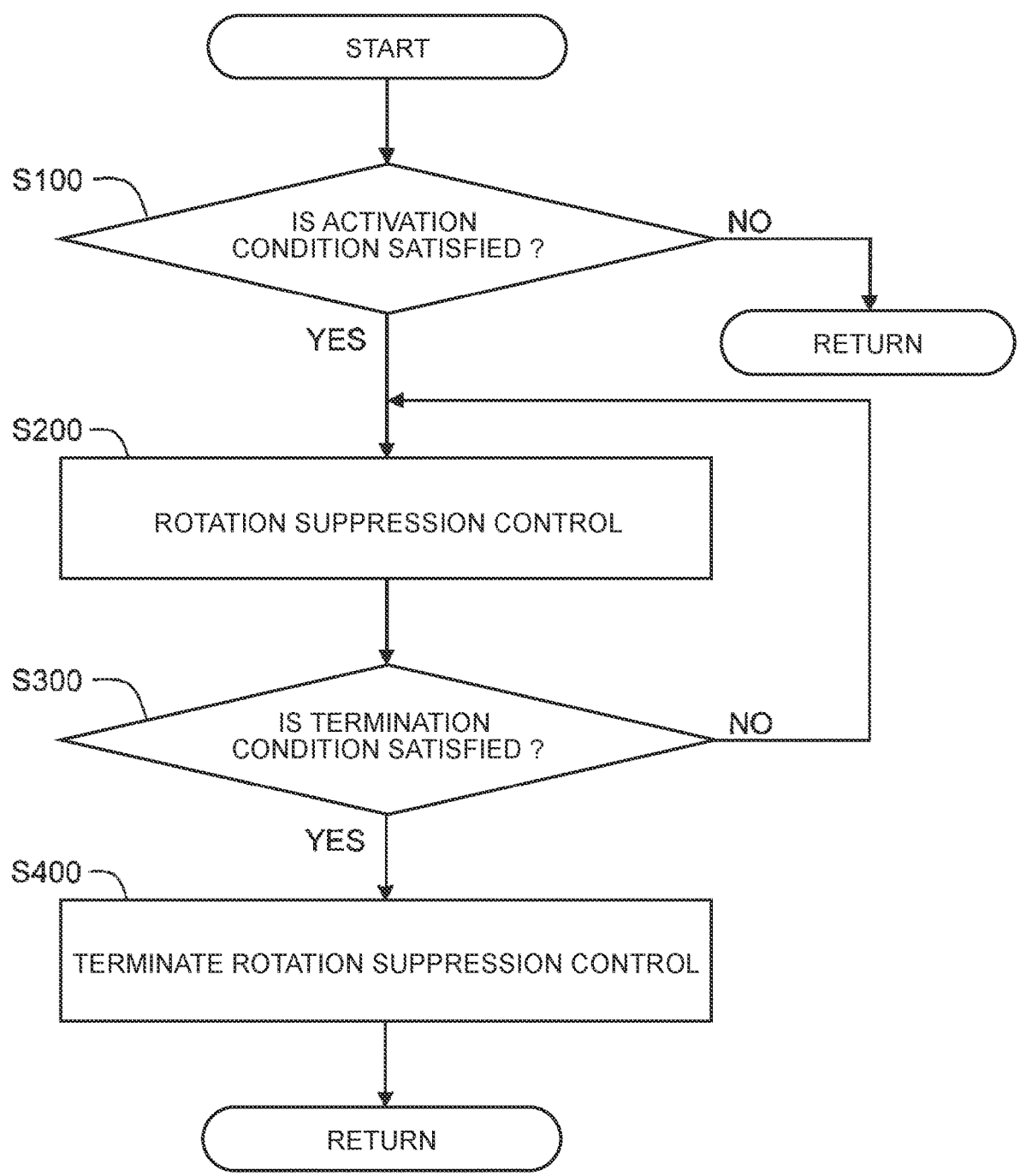
FIG. 6 is a flowchart that shows a process related to rotation suppression control according to the embodiment of the disclosure.

Next, a flowchart of a process will be described. FIG. 6 is a flowchart that shows a process related to the rotation suppression control according to the present embodiment. In step S100, the electronic control unit 100 determines whether an activation condition is satisfied. The activation condition is a condition to activate the rotation suppression control. The activation condition includes a condition that the normal steering control is not needed. Various examples of the activation condition will be described in detail later. When the activation condition is not satisfied (No in step S100), the process in this cycle ends. When the activation condition is satisfied (Yes in step S100), the process proceeds to step S200.

In step S200, the electronic control unit 100 executes the rotation suppression control without prohibiting the rotation of the steering wheel 10. Specifically, the electronic control unit 100 acquires a steering speed A or a steering torque T as a steering parameter based on a result detected by the steering sensor (the steering angle sensor 51 or the steering torque sensor 52). The electronic control unit 100 determines a rotation suppression torque Ts for suppressing the rotation of the steering wheel 10 based on the steering parameter. The electronic control unit 100 generates the rotation suppression torque Ts by controlling the reaction actuator 30. In other words the electronic control unit 100 controls the reaction actuator 30 such that the rotation suppression torque Ts is applied to the steering wheel 10.

During the rotation suppression control, the electronic control unit 100 may turn the wheels 4 synchronously with the steering angle θ of the steering wheel 10. Alternatively, during the rotation suppression control, the electronic control unit 100 may stop turning the wheels 4.

In step S300, the electronic control unit 100 determines whether a termination condition is satisfied. The termination condition is a condition to terminate the rotation suppression control. Various examples of the termination condition will be described in detail later. When the termination condition is not satisfied (No in step S300), the electronic control unit 100 continues the rotation suppression control. When the termination condition is satisfied (Yes in step S300), the process proceeds to step S400.

In step S400, the electronic control unit 100 terminates the rotation suppression control.

Next, effects will be described. As described above, according to the present embodiment, when the activation condition including that the normal steering control is not needed is satisfied, the electronic control unit 100 executes the rotation suppression control for suppressing the rotation of the steering wheel 10 without prohibiting the rotation of the steering wheel 10. In the rotation suppression control, the electronic control unit 100 applies a rotation suppression torque Ts for suppressing the rotation of the steering wheel 10 to the steering wheel 10 by controlling the reaction actuator 30. Because the rotation of the steering wheel 10 is suppressed, the driver more easily uses the steering wheel 10 for purposes other than steering. In other words, the usability of the steering wheel 10 improves.

As a comparative example, the technique described in JP 2009-090686 A will be discussed. According to the comparative example, in order for the steering wheel 10 not to rotate even when external force is applied, the steering wheel 10 is completely locked by actuating the reaction actuator 30. At this time, the reaction actuator 30 outputs a large torque such that the steering wheel 10 to which external force is applied does not rotate. When application of external force to the steering wheel 10 continues for a long time, the reaction actuator 30 needs to continuously output a large torque. As a result, the reaction actuator 30 may overheat. Overheating of the reaction actuator 30 causes degradation of the reaction actuator 30. When overheat protection control activates, the output torque of the reaction actuator 30 is limited. Degradation or output limitation of the reaction actuator 30 impairs normal steering control thereafter.

On the other hand, in the present embodiment, control for completely locking the steering wheel 10 is not executed. The electronic control unit 100 executes the rotation suppression control without prohibiting the rotation of the steering wheel 10 (variations of the steering angle θ). Therefore, a large rotation suppression torque Ts is not unnecessarily generated. As a result, overheating of the reaction actuator 30 that generates a rotation suppression torque Ts is avoided. Avoiding overheating and degradation of the reaction actuator 30 is good from the viewpoint of normal steering control.

The steering parameter such as a steering speed A and a steering torque T reflects the rotation of the steering wheel 10, that is, driver's intention. By referencing such a steering parameter, it is possible to appropriately detect the rotation of the steering wheel 10, that is, driver's intention, and generate a rotation suppression torque Ts at appropriate timing.

As shown in FIG. 3 to FIG. 5, the magnitude of rotation suppression torque Ts may vary with the steering parameter. Thus, it is possible to generate a rotation suppression torque Ts having an appropriate magnitude. For example, when a driver input torque Td is relatively large, the steering parameter is also relatively large, so the rotation suppression torque Ts is also relatively large. Thus, an excessive rotation of the steering wheel 10 is prevented. On the other hand, when a driver input torque Td is relatively small, the steering parameter is also relatively small, so the rotation suppression torque Ts is also relatively small. This contributes to suppressing overheating of the reaction actuator 30.

Although the driver does not intend to use the steering wheel 10, the steering parameter may occur. For example, a steering parameter occurs when the hand of the driver just touches the steering wheel 10 a moment. When the dead band D is provided as shown in FIG. 3 and FIG. 4, erroneous generation of a rotation suppression torque Ts due to such noise is reduced. Erroneous activation of the rotation suppression control due to vibrations of the vehicle 1 is also reduced.

Next, examples of the activation condition and termination condition of the rotation suppression control will be described. A boarding action that the driver gets on the vehicle 1 and an alighting action that the driver gets off the vehicle 1 will be discussed. While the driver is performing the boarding action or the alighting action, the normal steering control is not needed. The driver may perform the boarding action or the alighting action using the steering wheel 10 as a support. Therefore, it is conceivable that the rotation suppression control is executed at least while the driver is performing the boarding action or the alighting action.

The activation condition of the rotation suppression control includes a condition that the boarding action or the alighting action is being performed. At least while the boarding action or the alighting action is being performed, the electronic control unit 100 determines that the normal steering control is not needed and the activation condition is satisfied.

FIG. 7 is a block diagram that shows an example of the configuration for detecting the boarding action and alighting action of the driver. The status sensor 50 that detects at least one of the status of the vehicle 1 and the status of the driver includes, for example, a door status sensor 54, a seat sensor 55, an ignition sensor 56, and a driver monitor 57.

The door status sensor 54 detects the open or closed state and locked state of a door of the vehicle 1. It is possible to detect a door opening action, door closing action, door lock action, and door unlock action of the driver based on a result detected by the door status sensor 54.

The seat sensor 55 detects whether the driver is seated on a driver seat. It is possible to detect that the driver has moved into the driver seat and that the driver has left the driver seat based on a result detected by the seat sensor 55.

The ignition sensor 56 detects whether an ignition is on or off. It is possible to detect an ignition-on operation and ignition-off operation of the driver based on a result detected by the ignition sensor 56.

The driver monitor 57 detects the status of the driver. For example, the driver monitor 57 includes an image capturing device installed in the cabin of the vehicle 1. It is possible to detect the presence of the driver and various operations of the driver by analyzing an image that is obtained by the image capturing device. A door opening action, a door closing action, a movement from the inside of the vehicle to the outside of the vehicle, and a movement from the outside of the vehicle to the inside of the vehicle are illustrated.

First, the alighting action will be discussed. After the vehicle 1 stops, the driver turns off the ignition. In response to the turning off of the ignition, the electronic control unit 100 terminates the normal steering control. After that, the driver performs the alighting action. Specifically, the driver unlocks the door and opens the door. Subsequently, the driver moves from the driver seat to the outside of the vehicle. Subsequently, the driver closes the door and locks the door.

The electronic control unit 100 is able to detect the alighting action of the driver based on results detected by the sensors 54, 55, 56, 57. For example, the door unlock action or the door opening action in a state where the driver is seated on the driver seat is regarded as a start of the alighting action. For example, the door closing action or the door lock action in a state where the driver is not seated on the driver seat is regarded as a termination of the alighting action.

The electronic control unit 100 executes the rotation suppression control at least while the alighting action is being performed. For example, the electronic control unit 100 starts the rotation suppression control in response to the start of the alighting action. Alternatively, the electronic control unit 100 may regard turning off of the ignition as a start of the alighting action, and start the rotation suppression control in response to the turning off of the ignition. After that, the electronic control unit 100 terminates the rotation suppression control in response to completion of the alighting action. In other words, the termination condition is a condition that the alighting action completes.

Next, the boarding action will be discussed. The driver unlocks the door and opens the door. Subsequently, the driver moves from the outside of the vehicle into the driver seat. Subsequently, the driver closes the door and locks the door. After that, the driver turns on the ignition. The electronic control unit 100 starts the normal steering control in response to the turning on of the ignition.

The electronic control unit 100 is able to detect the boarding action of the driver based on results detected by the sensors 54, 55, 56, 57. For example, the door unlock action or the door opening action in a state where the driver is not seated on the driver seat is regarded as a start of the boarding action. For example, the door closing action or the door lock action in a state where the driver is seated on the driver seat is regarded as completion of the boarding action.

The electronic control unit 100 executes the rotation suppression control at least while the boarding action is being performed. For example, the electronic control unit 100 starts the rotation suppression control in response to the start of the boarding action. After that, the electronic control unit 100 terminates the rotation suppression control in response to completion of the boarding action. Alternatively, the electronic control unit 100 may regard turning on of the ignition as completion of the boarding action, and start the rotation suppression control in response to the turning on of the ignition. In other words, the termination condition is a condition that the boarding action completes or the ignition is turned on.

Figure 8:
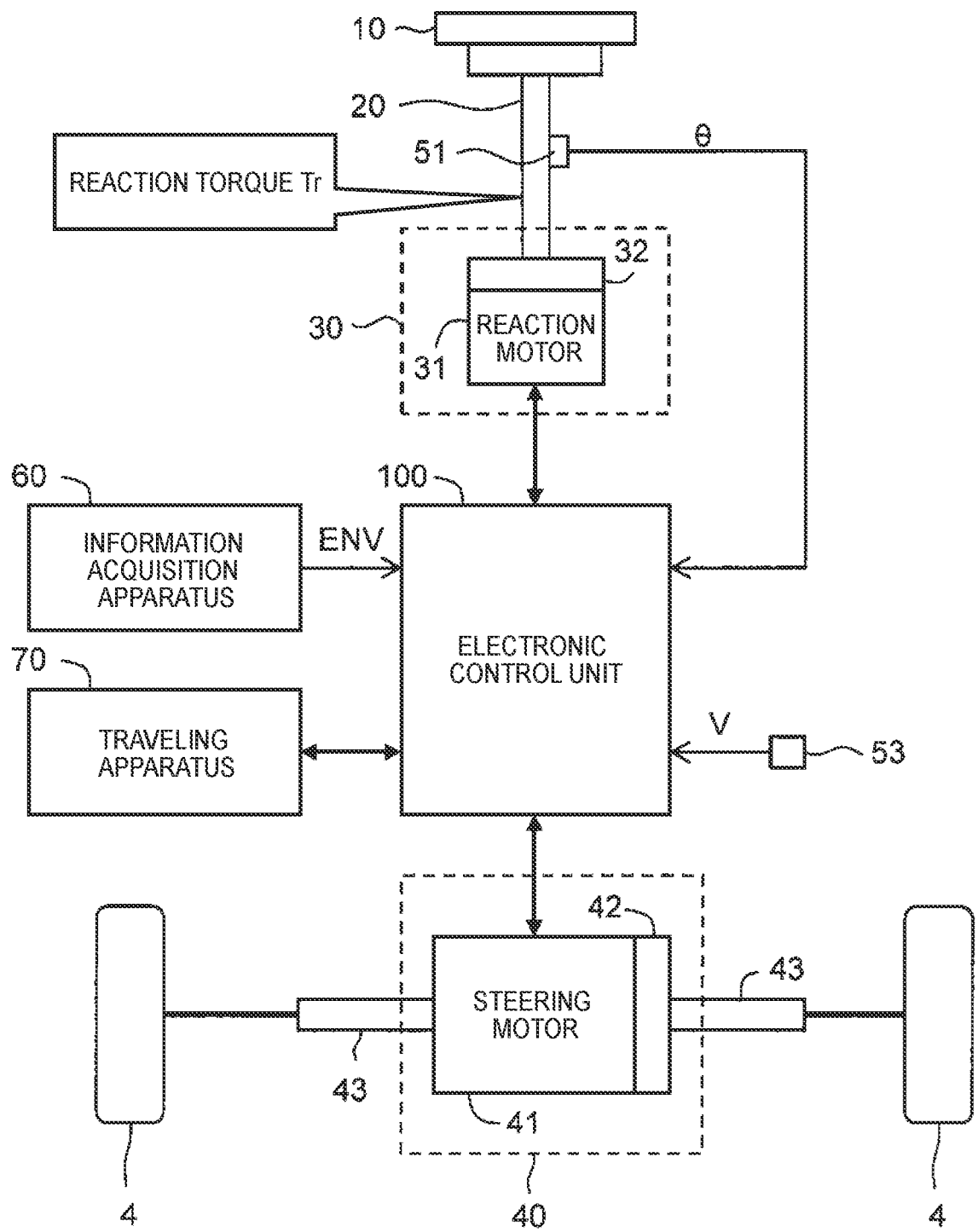
FIG. 8 is a block diagram that schematically shows an example of the configuration of a case where the vehicle executes autonomous driving control according to the embodiment of the disclosure.

Next, the autonomous driving control will be described. FIG. 8 is a block diagram that schematically shows an example of the configuration of a case where the vehicle 1 executes the autonomous driving control according to the present embodiment. The vehicle 1 includes an information acquisition apparatus 60 and a traveling apparatus 70 in addition to the components shown in FIG. 1.

The information acquisition apparatus 60 acquires driving environment information ENV that indicates a driving environment of the vehicle 1. The driving environment information ENV contains positional information, map information, surrounding situation information, vehicle status information, and the like. The positional information is information that indicates the position of the vehicle 1 and is obtained by using, for example, a global positioning system (GPS). The map information indicates lane arrangements and road shapes. The surrounding situation information is information that indicates a situation around the vehicle 1 and is obtained by using an external sensor, such as a camera, a lidar, and a radar. For example, the surrounding situation information contains information about surrounding vehicles and white lines around the vehicle 1. The vehicle status information contains a vehicle speed V, a lateral acceleration, a yaw rate, and the like. These pieces of vehicle status information are acquired by the status sensor 50. The information acquisition apparatus 60 sends the acquired driving environment information ENV to the electronic control unit 100.

The traveling apparatus 70 includes a drive device and a braking device. The drive device is a power source for generating driving force. An electric motor or an engine is illustrated as the drive device. The braking device generates braking force. The operation of the traveling apparatus 70 is controlled by the electronic control unit 100.

The electronic control unit 100 executes the autonomous driving control for controlling autonomous driving of the vehicle 1 based on the driving environment information ENV. For example, the electronic control unit 100 calculates a target trajectory based on the driving environment information ENV. The electronic control unit 100 automatically controls steering, acceleration, and deceleration of the vehicle 1 such that the vehicle 1 travels along the target trajectory. Specifically, the electronic control unit 100 controls steering of the vehicle (turning of the wheels 4) by controlling the steering actuator 40. The electronic control unit 100 controls the acceleration and deceleration of the vehicle 1 by controlling the traveling apparatus 70.

During execution of the autonomous driving control, the normal steering control commensurate with steering of the driver is not needed. Therefore, during execution of the autonomous driving control, the electronic control unit 100 may execute the rotation suppression control.

The activation condition of the rotation suppression control includes a condition that the autonomous driving control is being executed. During execution of the autonomous driving control, the electronic control unit 100 determines that the normal steering control is not needed and the activation condition is satisfied. The electronic control unit 100 executes the rotation suppression control. When the autonomous driving control terminates, the electronic control unit 100 terminates the rotation suppression control and starts the normal steering control.

Because the rotation suppression control is activated during execution of the autonomous driving control, the steering wheel 10 is difficult to erroneously rotate. For example, when the driver erroneously touches the steering wheel 10, a sudden rotation of the steering wheel 10 is prevented.

What is claimed:

1. A control apparatus for a vehicle provided with a steer-by-wire system, the vehicle including
    a steering actuator configured to turn a wheel of the vehicle,
    a reaction actuator configured to apply a torque to a steering wheel of the vehicle, and
    a steering sensor configured to detect a rotation of the steering wheel,
    the control apparatus comprising an electronic control unit configured to:
        execute normal steering control for, according to the rotation of the steering wheel, turning the wheel by controlling the steering actuator and applying a reaction torque to the steering wheel by controlling the reaction actuator;
        when an activation condition including that the normal steering control is not needed is satisfied, execute rotation suppression control for suppressing the rotation of the steering wheel without locking the rotation of the steering wheel; and
        in the rotation suppression control, acquire a steering speed or steering torque of the steering wheel as a steering parameter based on a result detected by the steering sensor, determine a rotation suppression torque for suppressing the rotation of the steering wheel based on the steering parameter, and control the reaction actuator such that the rotation suppression torque is applied to the steering wheel.

2. The control apparatus according to claim 1, wherein:
    a first steering parameter is less than a second steering parameter; and
    the rotation suppression torque in a case where the steering parameter is the first steering parameter is less than the rotation suppression torque in a case where the steering parameter is the second steering parameter.

3. The control apparatus according to claim 1, wherein, when the steering parameter falls within a predetermined range including zero, the rotation suppression torque is zero.

4. The control apparatus according to claim 3, wherein, when the steering parameter falls outside the predetermined range, the rotation suppression torque constantly increases with the steering parameter.

5. The control apparatus according to claim 1, wherein, in an entire range of the steering parameter, the rotation suppression torque increases in a stepwise manner with the steering parameter.

6. The control apparatus according to claim 1, wherein, in an entire range of the steering parameter, the rotation suppression torque constantly increases with the steering parameter.

7. The control apparatus according to claim 1, wherein:
    the vehicle further includes a status sensor configured to detect at least one of a status of the vehicle or a status of a driver of the vehicle; and
    the electronic control unit is configured to,
        based on a result detected by the status sensor, detect a boarding action that the driver gets on the vehicle or an alighting action that the driver gets off the vehicle, and
        at least while the boarding action or the alighting action is being performed, determine that the normal steering control is not needed and the activation condition is satisfied.

8. The control apparatus according to claim 7, wherein:
    the status sensor includes at least any one of a door status sensor, a seat status sensor, an ignition sensor, or a driver monitor;
    the door status sensor is configured to detect an open or closed state and locked state of a door of the vehicle;
    the seat status sensor is configured to detect whether the driver is seated on a driver seat;
    the ignition sensor is configured to detect whether an ignition is on or off; and
    the driver monitor is configured to detect the status of the driver.

9. The control apparatus according to claim 7, wherein:
    the electronic control unit is configured to start the rotation suppression control in response to turning off of an ignition or a start of the alighting action; and
    the electronic control unit is configured to stop the rotation suppression control in response to completion of the alighting action.

10. The control apparatus according to claim 7, wherein:
    the electronic control unit is configured to start the rotation suppression control in response to a start of the boarding action; and
    the electronic control unit is configured to stop the rotation suppression control in response to completion of the boarding action or turning on of an ignition.

11. The control apparatus according to claim 1, wherein:
    the electronic control unit is configured to execute autonomous driving control for controlling autonomous driving of the vehicle; and
    the electronic control unit is configured to, while the autonomous driving control is being executed, determine that the normal steering control is not needed and the activation condition is satisfied.

12. A control method for a vehicle provided with a steer-by-wire system, the vehicle including
    a steering actuator configured to turn a wheel of the vehicle,
    a reaction actuator configured to apply a torque to a steering wheel of the vehicle, and
    a steering sensor configured to detect a rotation of the steering wheel,
    the control method comprising:
        executing normal steering control for, according to the rotation of the steering wheel, turning the wheel by controlling the steering actuator and applying a reaction torque to the steering wheel by controlling the reaction actuator;

when an activation condition including that the normal steering control is not needed is satisfied, executing rotation suppression control for suppressing the rotation of the steering wheel without locking the rotation of the steering wheel; and in the rotation suppression control, acquiring a steering speed or steering torque of the steering wheel as a steering parameter based on a result detected by the steering sensor, determining a rotation suppression torque for suppressing the rotation of the steering wheel based on the steering parameter, and controlling the reaction actuator such that the rotation suppression torque is applied to the steering wheel.

* * * * *